Oct. 23, 1934.      C. A. PURDY      1,977,696
ARTICLE CONVEYING APPARATUS
Filed Jan. 10, 1934
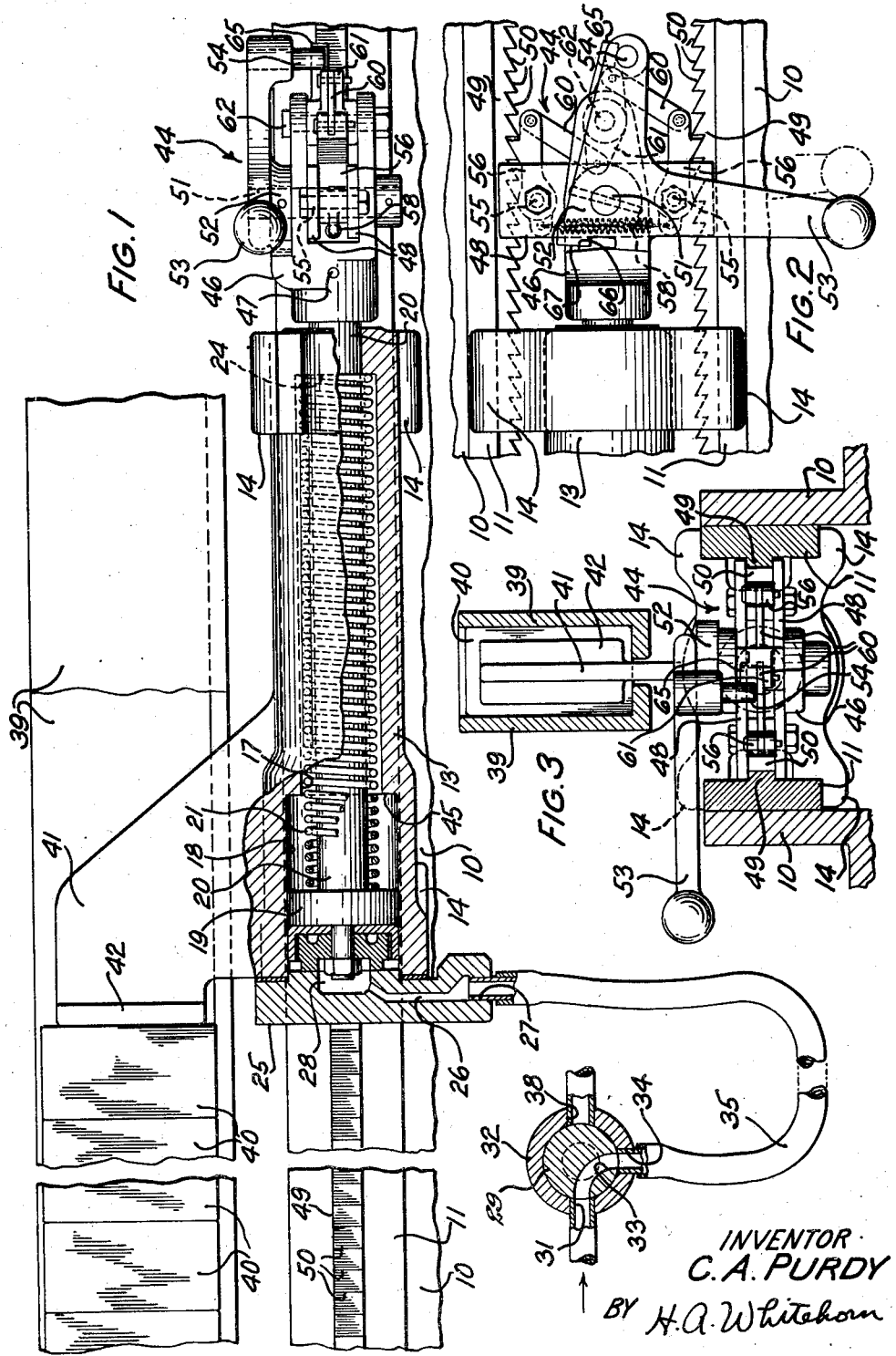
INVENTOR
C. A. PURDY
BY H. A. Whitehorn
ATTORNEY Patented Oct. 23, 1934

1,977,696

UNITED STATES PATENT OFFICE 1,977,696

ARTICLE CONVEYING APPARATUS

Chester A. Purdy, Oak Park, Ill., assignor to Western Electric Company, Incorporated, New York, N. Y., a corporation of New York Application January 10, 1934, Serial No. 705,982

7 Claims. (Cl. 198—218)

This invention relates to article conveying apparatus, and more particularly to an apparatus for feeding or transferring articles.

The primary object of this invention is to provide a simple, reliable, and efficient apparatus for conveying articles.

One form of conveying apparatus embodying the features of the invention comprises an air cylinder arranged to travel upon a pair of rails, the cylinder having a pusher member extending upwardly and between a second pair of rails and engaging behind a row of abutting articles slidably supported upon the rails. A spring loaded piston is carried within the cylinder and is connected to a manually releasable pawl mechanism engaging ratchet teeth on the cylinder rails. Upon compressed air being supplied to one end of the cylinder forward of the piston, the piston stands still, due to the pawl and ratchet mechanism, and the cylinder is stepped ahead a predetermined distance equal to the space between the centers of the articles. During this movement of the cylinder the piston is spring loaded. A flexible hose connects the cylinder to a stationary valve operated at predetermined intervals to first supply air to the cylinder, and then to permit the cylinder to exhaust to atmosphere, whereupon the spring loaded piston is unloaded and advances to its normal position relative to said cylinder, carrying with it the pawl mechanism which moves idly over the ratchet teeth. During this movement of the piston and pawl mechanism the cylinder stands still, due to the inertia thereof while resting upon the supporting rails.

Other features and advantages of the invention will become apparent from the following detailed description, taken in connection with the accompanying drawing, wherein Fig. 1 is a fragmentary front elevational view, partly in section, of an article conveying apparatus embodying the features of the invention;

Fig. 2 is a fragmentary plan view of Fig. 1, and

Fig. 3 is a fragmentary end view looking toward the left of Fig. 1.

The features of this invention have been shown applied to the intermittent conveying of articles, for example, electrical condenser containers arranged in end to end abutting relation into successive alinement with a sealing compound supply spout where they are filled with compound to seal the condensers therein.

Referring to the drawing, a pair of spaced horizontal supporting members comprising angle irons 10 have fixed to their opposed inner surfaces supporting and guiding rails 11. A cylinder 13 is disposed between the rails 11 and is slidably supported and guided thereon by pairs of upper and lower lugs 14 arranged at opposite ends of the cylinder engaging horizontal surfaces on the rails. The cylinder 13 is provided with a shouldered bore 17 (Fig. 1) enlarged at its left end to form a chamber 18 within which is a piston 19. Fixed to the piston 19 is a rod 20 which has a sliding fit in a reduced portion of the cylinder bore 17 at the right end of the cylinder 13. Surrounding the piston rod 20 is a coiled compression spring 21 having its opposite ends abutting the right side of the piston 19 and an annular surface 24 of the cylinder bore 17. A head 25 is fixed to the left end of the cylinder 13 and is formed with a fluid channel 26 communicating at one end with a port 27 and at its opposite end with a chamber 28 formed in the head, whereby compressed air entering the port is directed against the left end face of the piston 19 when a rotary two-way valve 29 is positioned as shown in the drawing. A port 31 of a stationary valve casing 32 of the valve 29 is connected to a source of compressed air supply (not shown). The port 31 communicates with one end of a channel 33 of the valve 29 and the opposite end of the channel communicates with a port 34 which is connected to the port 27 of the cylinder head 25 by a flexible hose 35, shown fragmentarily. The length of the hose 35 should be sufficient to take care of the particular range of travel of the cylinder 13 on the rails 11 without stressing the connections of the hose to the cylinder head 25 and the valve casing 32. An exhaust port 38 of the valve casing 32 serves to connect the hose 35 to atmosphere when the valve 29 is rotated counterclockwise 90°, whereupon the channel 33 will be in communication at opposite ends with the ports 34 and 38.

Arranged above and alined with the cylinder 13 is a pair of L-shaped spaced rails 39 upon the upper surfaces of the inwardly turned flanges of which a row of articles, such as electrical condenser containers 40, are supported and guided during a step-by-step advance thereof from one position to another. Integral with the cylinder 13 is a pusher member 41 which extends upwardly from the cylinder and between the rails 39, the member 41 terminating in a head portion 42 at its left end which engages the right end of the end container 40 of the row of containers.

In the present application of the invention a stationary spout (not shown) connected to a sealing compound supply source, with which compound the containers 40 are filled as they are stepped along on the rails 39, is positioned directly above the containers and at the left end of the row of containers.

The right end of the piston rod 20 which projects through the cylinder bore 17 has fixed thereto a manually releasable pawl mechanism indicated in general at 44, which serves to hold the piston 19 stationary when compressed air is directed against its left end surface, in the operation of the apparatus, to force the cylinder 13 and the attached pusher member 41 to be stepped to the left a distance substantially equal to the space between the right end surface of the piston and an annular surface 45 (Fig. 1) of the cylinder bore 17. This space is equal to the space between the centers of two abutting containers.

The pawl mechanism 44 comprises a bifurcated supporting member 46 which is pinned to the right end of the piston rod 20, as indicated at 47. Secured to the opposed inner surfaces of the furcations of the member 46 are rectangular shaped plates 48 having their outer ends slidable upon horizontal surfaces of inwardly extending arms 49 of the cylinder rails 11, the opposed vertical surfaces of the arms 49 having formed thereon ratchet teeth 50. Pivoted at 51 to the upper surface of the member 46 is a bell crank lever 52, the long arm of which serves as a hand grip 53 and the short arm carries a depending actuator pin 54 (Fig. 1). Carried between the plates 48 adjacent their outer ends and pivoted thereto as indicated at 55 are ratchet pawls 56, the left ends of which are connected together by a coiled tension spring 58 which normally tends to hold the pawls in operative engagement with the rachet teeth 50. Pivotally connected to the pawls 56 at their right ends are links 60, the opposite ends of the links being similarly connected to a double ended lever 61 arranged between the furcations of the member 46 and pivoted thereto as indicated at 62. The lever 61 at its right end is provided with a head 65 which lies in the path of the depending actuator pin 54 fixed to the short arm of the bell crank lever 52 carrying the hand grip 53. Cooperating stop surfaces 66 and 67 on the member 46 and the bell crank lever 52, respectively, serve to limit the movement of the lever in either direction about its pivot 51. It will be apparent that when the lever 52 is rocked by means of its hand grip 53 about its pivot 51 to the dotted line position of the outer end of the hand grip, the actuator pin 54 abutting the head 65 of the lever 61 will rock the latter lever counterclockwise about its pivot 62 and through the links 60, the pawls 56 will be withdrawn from holding engagement with the ratchet teeth 50 of the rails 11. The operator, still holding the pawls 56 withdrawn, may then slide the article conveying apparatus as a whole to the right upon its supporting and guiding rails 11 to a starting position or for any other purpose, and upon releasing the hand grip 53 the tension spring 58 will return the parts of the pawl mechanism 44 to their normal position, as shown in the drawing.

In the operation of the above described article conveying apparatus, assuming it is at its starting position, as shown, with the spring 21 holding the piston 19 abutting the inner surface of the cylinder head 25 and the pawls 56 of the mechanism 44 in their normal position slightly spaced for clearance purpose from the vertical faces of the ratchet teeth 50, a row of articles or containers 40 are positioned in end to end abutting relation on the inwardly turned flanges of the rails 39 with the right end container of the row abutting the pusher member 41, as shown in Fig. 1. The rotary air valve 29 is then set in motion by suitable mechanism which also may control the flow of the compound from the delivery spout in timed relation with the operation of the valve, which is not shown, since it is not believed necessary to a complete understanding of this invention. The air valve 29 is immediately rotated clockwise 90° to the position shown in Fig. 1, which connects the ports 31 and 34, whereupon the compressed air supply is connected to the hose 35 and thus air pressure is immediately exerted against the left end of the piston 19 which it will be apparent is locked against movement by the pawls 56 engaging the ratchet teeth 50. Since the piston 19 can not move, the cylinder 13 is stepped to the left until the annular surface 45 of the cylinder bore 17 abuts the right end of the piston 19 and through the pusher member 41 fixed to the cylinder 13 the row of containers 40 is advanced along the rails 39 a distance substantially equal to the space between the annular surface 45 and the right end of the piston 19.

In the particular application of the invention the left end container 40 in the row is alined with the sealing compound supply spout (not shown) which in timed relation with the stepping of successive containers 40 thereunder is supplied with the compound which flows into the container. When the container 40 is filled with the compound the flow of compound stops and the air valve 29 is rotated counterclockwise 90° to connect the ports 34 and 38 which cuts off the compressed air supply to the cylinder 19 from the port 31 and permits the cylinder to exhaust to atmosphere through the port 38. In the stepping ahead of the cylinder 19 the spring 21 was compressed and upon release of the compressed air in the cylinder at the left end of the piston 19 through the port 38 the loaded spring immediately expands and moves the piston to the left to its normal position, as shown in Fig. 1. The stepping ahead of the piston 19 advances the pawls 56 idly over a predetermined number of the ratchet teeth 50 and at the end of the movement of the piston against the cylinder head 25 the pawls 56 move into engagement with the alined ratchet teeth, thus locking the piston from movement during the next advance movement of the cylinder 13, except for a slight rearward movement of the piston to close up a clearance space between vertical faces of the pawls and the ratchet teeth (Fig. 2). The cylinder 13 remains in its last advanced position during the movement of the piston 19 and the attached pawl mechanism 44 to their normal positions due to its inertia and that of the containers 40 abutting the pusher member 41 and the friction between the lugs 14 of the cylinder and the rails 11. Immediately thereafter the air valve 29 is rotated clockwise 90° to again connect the compressed air supply port 31 with the cylinder 13, with the result that the next container 40 in the row thereof is advanced into alinement with the sealing compound supply spout and in the continued operation of the apparatus the cycle just described is repeated until the row of containers have been filled with the compound. Thereafter the apparatus may be returned to its starting position in the manner previously described.

It will be evident from the above description of the article conveying apparatus of this invention that there is provided a motive fluid cylinder and piston for successively feeding or conveying articles in which a long intermittent feeding stroke is accomplished with a short cylinder with the result that the space occupied by the cylinder and its conveying elements outside the active range of its total stroke is materially reduced. Also for intermittent conveying action through long distance the quantity of motive fluid required to charge the cylinder of the described apparatus is greatly reduced.

Although in the drawing the features of this invention have been shown applied to the conveying of articles along a straight path, it is to be understood that the apparatus may also be used to convey articles along arcuate, sinuous, or circular paths.

It is also obvious that the above described article conveying apparatus can be built for slow or very rapid action, depending upon the inertia built into the elements thereof and the pressure regulation of the motive fluid used, and that it may find a wide application for conveying articles for purposes substantially different from the kind herein described.

It will be understood that the embodiment herein described is merely illustrative of the invention and one application thereof, the invention being limited only by the scope of the appended claims.

What is claimed is:

1. In an apparatus for conveying articles, a motive fluid movable cylinder, a piston movable in said cylinder, means including a motive fluid system communicating with said cylinder for causing relative successive movements between said cylinder and piston, and means for transmitting motion to an article upon relative successive movements between said cylinder and piston.

2. In an apparatus for conveying articles, a motive fluid movable cylinder for conveying an article, means for guiding said cylinder in its movement, a piston in said cylinder, means operatively associated with said piston for maintaining the same stationary during movement in one direction of said cylinder, means for storing up energy against one end of said piston responsive to said movement of said cylinder, and means for directing motive fluid into said cylinder against the opposite end of said piston to cause said cylinder to move, said energy storing means being rendered effective to move said piston to its normal position relative to said cylinder when the motive fluid is released from said cylinder.

3. In an apparatus for conveying articles, a motive fluid movable cylinder for conveying an article, means for guiding said cylinder in its movement, a spring loaded piston in said cylinder, said piston being loaded during movement in one direction of said cylinder, means operatively connected to said piston for maintaining the same stationary during said movement of said cylinder, and means for directing motive fluid into said cylinder and against said stationary piston to cause said cylinder to move, said piston being unloaded for movement to its normal position relative to said cylinder when the motive fluid is released from said cylinder.

4. In an apparatus for conveying articles, a motive fluid movable cylinder for conveying an article, means for guiding said cylinder in its movement, a piston in said cylinder, an elastic element abutting one end of said piston adapted to be loaded during movement in one direction of said cylinder, a member connected to said piston and extending outside of said cylinder, means operatively associated with said member for maintaining the member and thereby the piston stationary during said movement of said cylinder, and means for directing motive fluid into said cylinder and against said stationary piston to cause said cylinder to move, said elastic element being unloaded for moving said piston to its normal position relative to said cylinder when the motive fluid is released from said cylinder.

5. In an apparatus for conveying articles, a motive fluid movable cylinder for conveying an article, means for guiding said cylinder in its movement, a piston in said cylinder, an elastic element abutting one end of said piston adapted to be loaded during movement in one direction of said cylinder, a pawl and ratchet mechanism operatively associated with said piston for maintaining the same stationary during said movement of said cylinder, and means for directing motive fluid into said cylinder and against said stationary piston to cause said cylinder to move, said elastic element being unloaded for moving said piston to its normal position relative to said cylinder when the motive fluid is released from said cylinder.

6. In an apparatus for conveying articles, a motive fluid movable cylinder for conveying an article, a track upon which said cylinder moves, a spring loaded piston in said cylinder, said piston being loaded in response to a movement in one direction of said cylinder, a ratchet track extending along said cylinder track, a pawl mechanism connected to said piston operatively engaging said ratchet track for maintaining said piston stationary during said movement of said cylinder and permitting said piston to move when the piston is unloaded, and means for directing motive fluid into said cylinder and against said stationary piston to cause said cylinder to move, said piston being unloaded for movement to its normal position relative to said cylinder when the motive fluid is released from said cylinder.

7. In an apparatus for conveying articles, a motive fluid movable cylinder for intermittently conveying an article, means for guiding said cylinder in its movement, a piston in said cylinder, means for storing up energy against one end of said piston responsive to movement in one direction of said cylinder, a ratchet track adjacent the path of movement of said cylinder, a pawl mechanism connected to said piston operatively engaging said ratchet track for maintaining said piston stationary during said movement of said cylinder and permitting said piston to move when said energy storing up means is rendered effective, and means for directing motive fluid into said cylinder against the opposite end of said piston to cause said cylinder to move, said energy storing means being rendered effective to move said piston to its normal position relative to said cylinder when the motive fluid is released from said cylinder.

CHESTER A. PURDY.